US010061563B2

(12) United States Patent
Rosca et al.

(10) Patent No.: US 10,061,563 B2
(45) Date of Patent: Aug. 28, 2018

(54) HARDWARE NON-DETERMINISTIC RANDOM BYTE GENERATOR

(71) Applicant: NEOPOST TECHNOLOGIES, Bagneux (FR)

(72) Inventors: Adriana Rosca, Suresnes (FR); Jean Pierre Meur, La Villa du Bois (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 151 days.

(21) Appl. No.: 15/006,991

(22) Filed: Jan. 26, 2016

(65) Prior Publication Data
US 2016/0216945 A1 Jul. 28, 2016

(30) Foreign Application Priority Data

Jan. 27, 2015 (EP) .................................... 15305085

(51) Int. Cl.
*G06F 7/58* (2006.01)
(52) U.S. Cl.
CPC .......... *G06F 7/588* (2013.01); *G06F 2207/58* (2013.01)
(58) Field of Classification Search
CPC ...................................................... G06F 7/588
See application file for complete search history.

(56) References Cited

U.S. PATENT DOCUMENTS

| 6,219,789 | B1* | 4/2001 | Little | G06F 7/588 |
| | | | | 726/34 |
| 2006/0218212 | A1* | 9/2006 | Mattison | H03K 3/84 |
| | | | | 708/251 |
| 2012/0123693 | A1 | 5/2012 | Wilber | |
| 2013/0110895 | A1* | 5/2013 | Valentino | G06F 7/588 |
| | | | | 708/255 |
| 2016/0110164 | A1* | 4/2016 | Suarez | G06F 7/588 |
| | | | | 708/250 |
| 2016/0202954 | A1* | 7/2016 | Manipatruni | H01F 10/3254 |
| | | | | 708/250 |

OTHER PUBLICATIONS

European Search Report, EP Application No. 15305085, dated Jul. 28, 2015, 2 pages.
Eather, D., "Random Number Generation with Simple Transistor Junction Noise Source," Version 1 Revision 2, Jun. 22, 2004, URL:http://imotp.sourceforge.net/noise.pdf, 36 pages.
Kilgore, I., "Hardware Random Number Generator," Jun. 6, 2014, URL:http://iank.org/trng/html, 13 pages.
Logue, A., "Hardware Random Number Generator," May 1, 2002, URL:http://cryogenius.com/hardware/rng, 4 pages.
Zinke, B., "Postal Security Device," May 25, 2007, URL:http://csrc.nist.gov/groups/STM/cmvp/documents/140-1/140sp/140sp981.pdf, 18 pages.

* cited by examiner

*Primary Examiner* — Chuong D Ngo
(74) *Attorney, Agent, or Firm* — Seed IP Law Group LLP

(57) ABSTRACT

A random byte generator comprising a noise source configured to generate a noise signal, a digitizer with a resolution of no less than two bits and configured to digitize the noise signal from the noise source, and a processor configured to apply pre-defined rules for selecting bits captured by said digitizer and to generate random bit strings by combining the selected bits.

15 Claims, 2 Drawing Sheets

HARDWARE NON-DETERMINISTIC RANDOM BYTE GENERATOR

BACKGROUND

Technical Field

The present application relates to a hardware non deterministic random byte generator, and more generally to random bit generation.

Description of the Related Art

As electronic data interchange (EDI) and digital communication usage is continuously expanding, securing such digital exchanges has become essential. Encryption technology typically is used to ensure communication security between distant devices. For example, digital signature algorithms are widely used for authenticating digital files. An essential need for data encryption is the generation of random numbers.

Encryption is used in particular in the industry of mailing systems. Mailing systems typically include a postage security device (PSD) for managing the postage funds in a secure manner. One of the main functions of the PSD is to ensure the security of the communication of the mailing system, especially with the postal authorities. Some critical security requirements are defined by postal authorities. Cryptographic methods are used to ensure the communication security, and are based on the generation of cryptographic keys, which require the generation of random numbers.

In the digital world, the generation of random numbers consists in the generation of random bits. Two types of random number generation are distinguished. The first type is a non deterministic random bit generator (NRBG), which is a random bit generator employing an entropy source. An entropy source produces an output of random bits that has full entropy. The entropy source includes a physical noise source (e.g., thermal noise or hard drive seek times), health tests, and an optional conditioning stage. Ideally, to say that a bit string provides full entropy would imply that it was selected uniformly at random from the set of bit strings having all the same length, in which case, each bit in the string would be uniformly distributed (i.e., equally likely to be 0 or 1) and statistically independent of the other bits in the string. However, for practical applications, the distribution uniformity and the statistical independence would be accepted within some limits. For example, the NIST SP 800-90B standard specifies that a N-bit string is said to provide full entropy if it is obtained through a process that is estimated to provide at least $(1-E) \times N$ bits of entropy, where: $0 < E < 2$ exponent $(-64)$. For NIST SP 800-90B, such strings are an acceptable approximation to the ideal.

The second type of random number generation is a deterministic random bit generator (DRBG). A DRBG is a random bit generator that employs a DRBG mechanism (or algorithm) and a source of entropy input. A DRBG produces a pseudorandom sequence of bits from an initial secret value called a seed (and, perhaps additional input). A DRBG is often called a pseudorandom bit (or number) generator.

Previously, postal authorities imposed security standards typically covered by the FIPS specifications, which allowed simpler methods for generating random bits. The seed could be generated by a random bit generator, which did not have to be strictly a NRBG. The initial seed could be provided to the PSD at the manufacturer's premises before shipment of the PSD to the customer. Then, a DRBG embedded in the PSD could generate random bits for the whole life of the PSD.

Recently, some postal authorities have decided that an initial seeding was not sufficient to ensure the security of the communication, and they have specified that reseeding is required on a regular basis. One way to meet this requirement is to include an entropy source within each PSD.

OBJECT AND DEFINITION OF THE INVENTION

Embedding a complete cryptographic random bit generator (i.e., including its own source of random bits combined with a DRBG) provides several advantages. The cryptographic functions of the PSD then are independent of the external world. Such an architecture can be easily adapted if postal authorities evolve further, requiring for example a high reseeding rate. The PSD does not require any external input for reseeding and the random bit generator is therefore immune to communication loss or communication security risks for its cryptographic functions. Additionally, the PSD does not require anymore the secured storage of such secret seeds.

The main issue for embedding a complete cryptographic random bit generator is to ensure that the entropy source provides a true unpredictable output, i.e. with a sufficient amount of randomness. This is particular difficult in the case of PSD in the mailing industry as the constraints in terms of space and of cost are drastic. Typically, the entropy source and associated conditioning circuits need to be implemented on an electronic board surface, which is less than 1 square centimeter. Meeting such requirements is also most beneficial for the mailing industry and any communication system, which needs to comply with strict security requirements.

Described herein is a hardware non deterministic random byte generator with a high quality entropy, without any conditioning stage and with the following advantages: low cost, compactness, flexibility for generating seeds at will.

To this end, at least some embodiments of the invention provide a random byte generator comprising:
- a noise source configured to generate a noise signal;
- a digitizer possessing a voltage input range and a resolution of no less than two bits and configured to digitize the noise signal from said noise source;
- a processor configured to apply pre-defined rules for selecting bits captured by said digitizer and to generate random bit strings by combining said selected bits.

Advantageously, said noise source amplifies said noise signal to provide a peak-to-peak random voltage amplitude matching said voltage input range of said digitizer.

Preferably, said noise source includes a final stage centering the continuous component of said peak-to-peak random voltage amplitude in the middle of said digitizer voltage input range.

In an embodiment, said pre-defined rules consist in selecting the least significant bits digitized by said digitizer and excluding at least the most significant bit digitized by said digitizer.

In a preferred embodiment, said digitizer has a ten bits resolution and said pre-defined rules consist in selecting the six least significant bits digitized by said digitizer.

According to a feature, said processor is configured to perform said combining said selected bits by concatenating into bytes the bits selected by said processor.

Conveniently, said noise source comprises no more than three discrete transistors T4, T5, T6, the emitter-base PN junction of a first discrete transistor T4, the collector of which is not connected, constituting the noise signal for said noise source.

Preferably, said discrete transistors are of the type 2N3904, and the noise source comprises at its output a low pass filter R25,C57 to comply with electromagnetic compatibility regulations.

The embodiments also apply to a postal security device including a random byte generator according to the above characteristics.

According to another embodiment, whenever a health test fail error is generated by the random byte generator, the postal security device is configured for deleting a master key, which is required to access all critical security parameters and data.

The embodiments of the invention may also relate to a method for generating random byte including the steps of:
  generating a noise signal with a noise source;
  digitizing the noise signal from said noise source with a digitizer possessing a voltage input range and a resolution of no less than two bits;
  applying in a processor pre-defined rules for selecting bits captured by said digitizer;
  combining said selected bits in the processor for generating random bit strings.

Preferably, this method includes also the following acts:
  amplifying said noise signal to provide a peak-to-peak random voltage amplitude matching said voltage input range of said digitizer;
  centering the continuous component of said peak-to-peak random voltage amplitude in the middle of said digitizer voltage input range;
  combining said selected bits by concatenating into bytes the bits selected by said processor;
  wherein said pre-defined rules consist in selecting the least significant bits digitized by said digitizer and excluding at least the most significant bit digitized by said digitizer;
  wherein said digitizer has a ten bits resolution and said pre-defined rules consist in selecting the six least significant bits digitized by said digitizer.

The previous method can be used in a postal security device wherein whenever a health test fail error is generated by the random byte generator, the postal security device is configured for deleting a master key, which is required to access all critical security parameters and data.

BRIEF DESCRIPTION OF THE DRAWINGS

Other aspects, features and advantages of the present teachings will become clearer to those ordinary skilled in the art upon review of the following description in conjunction with the accompanying drawings where.

DETAILED DESCRIPTION

Figure 3:
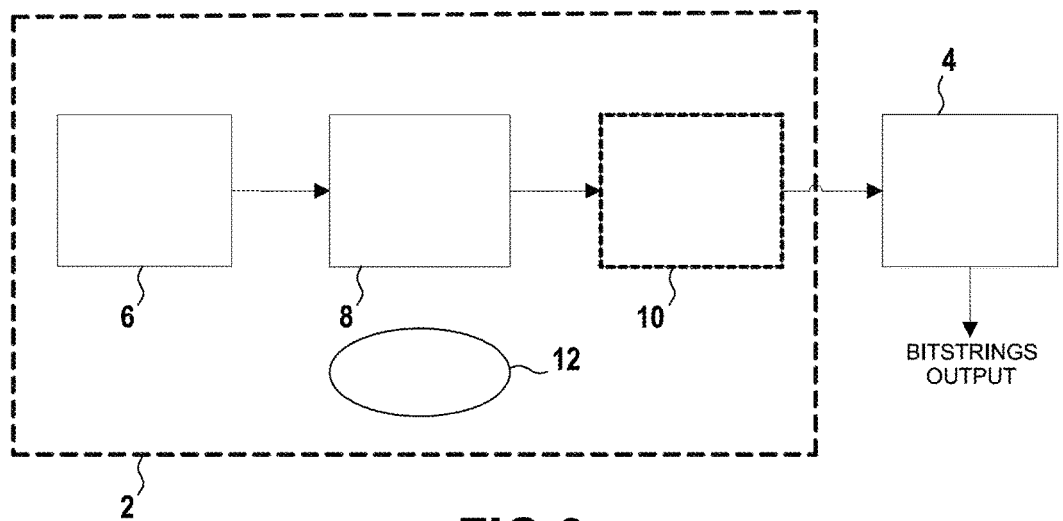
FIG. 3 shows a standard prior art system for generating bit strings.

FIG. 3 describes a standard prior art system for generating bit strings. Such a system is composed of an entropy source 2, which feeds a digital seed into a deterministic random bit generator 4 (DRBG) producing pseudorandom sequences of bits typically based on standard algorithms.

The entropy source includes a non-deterministic process 6, called a noise source, a digitization process 8 and a health testing module 10. The noise source produces an analogical random signal. The digitization samples the non-deterministic process to produce random binary data. High quality entropy sources also include some conditioning stage 12 for reducing bias and increasing the entropy of the resulting output bits flow. This conditioning stage consists in cryptographic algorithms, which are applied to the output bits flow, such as hashing programs. Such conditioning stages are also referred as correctors.

The health test component 10 ensures that the noise source and the entropy source as a whole continue to operate as expected. When testing the entropy source, the end goal is to obtain assurance that failures of the entropy source are caught quickly and with a high probability. Another aspect of a health testing strategy is to determine likely failure modes for the entropy source and, in particular, for the noise source.

Figure 1:
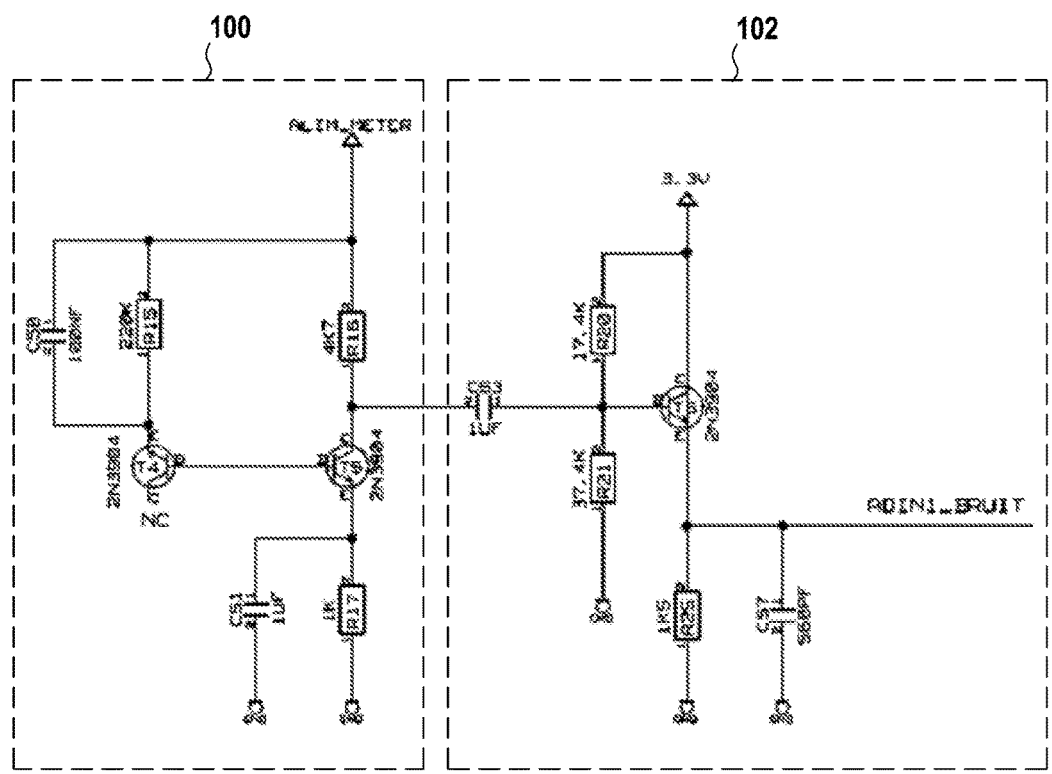
FIG. 1 shows the noise source comprising two stages: the noise generator stage and the adaptor stage.

The at least some embodiments of the present invention embed an entropy source, which is used for seeding the DRBG of the PSD, within the cryptographic boundary of the PSD. The first stage of the entropy source is the noise source, which generates a random analogical voltage. According to at least some aspects, this noise source illustrated on FIG. 1 comprises two stages: a noise generator stage 100 and an adaptor stage 102.

The noise generator uses the avalanche noise in a reversed-biased PN junction. When a diode is reverse-biased, a very little current flows and to a first order approximation the diode can be considered as an open circuit. However, if the reverse voltage is increased above what is referred to as the breakdown voltage, there is a dramatic increase in current and the diode is in avalanche breakdown. This usually occurs in lightly-doped PN junctions where the depletion layer is long (as opposed to Zener breakdown, which occurs in heavily doped PN junctions where the depletion layer is extremely thin). Such a breakdown mechanism is not destructive, and can be used for generating an electronic noise called avalanche noise. This avalanche noise occurs when carriers acquire enough kinetic energy under the influence of the strong electric field to create additional electron-hole pairs by colliding with the atoms in the crystal lattice. When this process spills over into an avalanche effect, random noise spikes are observed.

To create such an avalanche noise, one can use the base-emitter junction of a NPN transistor, the collector of which is not connected. The noise generator circuit advantageously uses the emitter-base PN junction of the transistor T4, which is reverse-biased. The second transistor T5 amplifies the avalanche noise of the PN junction.

The two stages of the noise source are linked by a capacitive connection via a 1 microfarad capacitor C53 so that only the fluctuating AC component of the amplified voltage from transistor T5 is transmitted from the noise generator stage to the adaptor stage. Then, the adaptor stage centers the continuous component of the noise signal in the middle of the voltage input range acceptable for the digitalization stage. In a preferred embodiment, the digitalization stage is an analogical/digital converter with a voltage input range of 3.3 volts. The transistor T6 of the adaptor stage is polarized by a 3.3 volts power line, and centers the continuous component of the noise signal at a voltage level of half the 3.3 volts power line (i.e. 1.65 volts) in the middle of the voltage input range of the analogical/digital converter with a bridge of resistors R20 and R21 of 17.4K ohm and 37, 4K ohm respectively.

The polarisations of the transistors are set to compensate for the variations of the transistors characteristics, and in particular for the manufacturing variations of the transistors' gain beta. Preferably, the resulting amplification by the noise source of the noise signal provides a peak-to-peak random voltage amplitude matching the voltage input range of the digitalization stage. In a preferred embodiment, the DC bias for transistor T4 is obtained by connecting its emitter to a 11.6 volts power supply via a 220K ohm resistor R15. The improved output level is due mainly to the inclusion of a 100 nanofarad capacitor C50 in parallel with resistor R15, which provides a low-impedance AC source to the noise source while not disturbing the DC bias of transistor T4. The transistor T5 is polarized by connecting its collector to the 11.6 volts power supply via a 4.7K ohm resistor R16. The static feedback is obtained by connecting T5 transistor's emitter to the ground via a 1K ohm resistor R17. The 1 microfarad capacitor C51 connected in parallel with resistor R17 optimizes the dynamic gain of the circuit as it shortcuts the T5 transistor's emitter to the ground for high frequencies.

Preferably, both stages of the noise source, i.e., the noise generator stage and the adaptor stage, are built with especially noisy transistors so as to maximize the generation of random noise. In a preferred embodiment, 2N3904 transistors are used, which are characterized by their noisy outputs. Such 2N3904 transistors are manufactured by several corporations including LGE, Fairchild, Infineon, Diodes, ON Semiconductor, Motorola, NXP and Weitron. The noise source circuit as shown on FIG. 1 allows compensating for variations on the gain beta of 2N3904 transistors, which fluctuate from 100 to 400. This noise source amplifies the avalanche noise of the emitter-base PN junction of the transistor T4, and provides a peak-to-peak random voltage between 1.5 volts and 3 volts depending on the components used in the circuit. This is an amazingly high noise level resulting from a minimal number of electronic discrete components, including only 3 discrete transistors.

The noise source is an efficient solution for generating an analogical white noise. However, the generation of such a noise within a PSD is contrary to usual electronic design for a security device such as a PSD, and therefore must be well controlled. In particular, a security device such as a PSD placed in an office equipment must comply with strict electromagnetic radiation standards such as CEM or FCC part 15. A low pass filter is added on the output of the hardware noise source in order to comply with electromagnetic compatibility regulations. Preferably, a capacitor C57 with a 560 pF value connects the noise source output to the ground in parallel to a resistance R25 with a 1500 ohm value.

Figure 2:
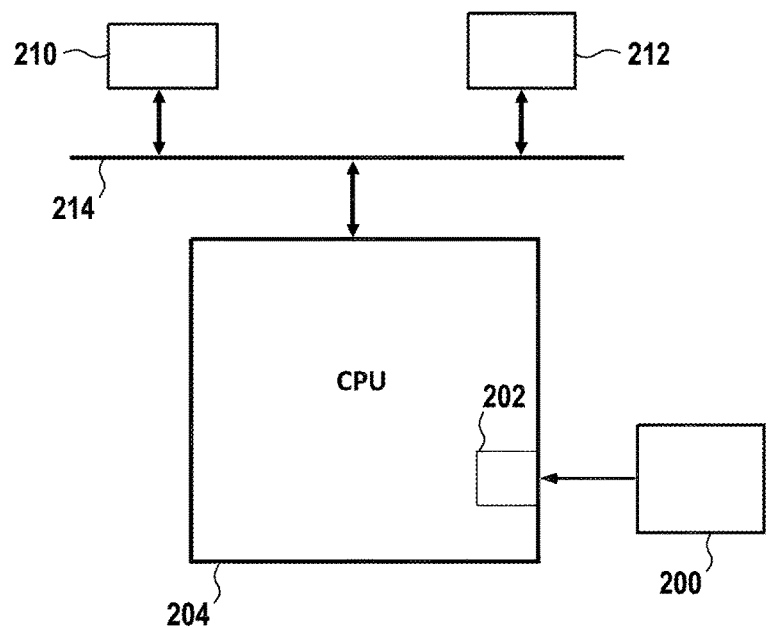
FIG. 2 shows the electronic schematic of the entropy source.

FIG. 2 shows the electronic schematic of the entropy source including the noise source 200 and the digitizer. In this figure, the digitization of the analogical signal of the noise source is performed by an analogical digital converter 202 (ADC) included in a processing unit 204. In a preferred embodiment, the processing unit is an AMR 9 microprocessor. Indeed, the digitizer includes at least 2 bit channels (i.e. the digitizer has a resolution of not less than two bits), otherwise it would be limited to a latch functionality. As a result of the design of the noise source described above, the two main characteristics of this noise source (i.e., the noise signal is centered in the middle of the voltage input range of the digitizer and its amplitude matches the voltage input range of the digitizer) ensure that the analogical noise signal generates random digital data over all the bit channels of the digitizer. The processing unit selects some specific bit channels of the digitizer according to pre-defined rules and processes the bits flow from these selected bit channels to generate random bit strings. The pre-defined rules are established in order to maximize the entropy of the generated random bit strings, and depend on the characteristics of the entropy source. The flow of random bits is stored in a memory 210, preferably in a volatile SDRAM memory. Once the random bits are processed for generating cryptographic keys, these keys are stored in a non-volatile memory 212, preferably a flash memory. Communication between the processor 204 and the memories is performed via a microbus 214.

Typically, digital processing are designed and optimized for processing bytes for example for data addressing. Also, cryptographic algorithms used for generating keys, such as RSA, ECDSA, HMAC or TDES algorithms, require bytes. The key generated by the RSA 2048 algorithm, for example, are made of 256 bytes. Therefore, preferably, the flow of random bit strings is concatenated by the processing unit 204 into a flow of random bytes. In order to maximize the throughput of the bytes generation, the digitizer should have a high sampling frequency and a high resolution allowing the capture of a large number of random bits for each sampling cycle performed by the digitizer. The entropy of the resulting flow of random bytes is then measured in bits per byte. Standard tools are provided within the industry for testing the quality of an entropy source. Examples of such tools are the NIST STS tool distributed by NIST for the Validation of Random Number Generators and Pseudo Random Number Generators for Cryptographic Applications or the ENT tool distributed by Fourmilab. Such tools measure the entropy of a standardized set of bytes generated by the entropy source to be tested.

In a preferred embodiment, the digitizer is an analogical digital converter (ADC) with a ten bit resolution, therefore allowing the selection of eight bits for each sampling cycle performed by the digitizer and therefore generating a random byte at the rate of the sampling frequency of the digitizer. Preferably, the analogical digital converter is included in a processor such as micro-processor LPC3220 manufactured by NXP. For this processor, the analogical digital converter has a sampling frequency of 400 kHz. In order to define the rules for selecting the bit channels of the digitizer, multiple entropy tests were performed on the entropy source for different selection rules of bit channels of the ADC. The ENT tool was used for testing the entropy source and for analyzing sets of bytes generated by the entropy source. Complex bit selection rules can improve the resulting bit entropy of the random byte generator, but they typically also impact negatively the byte generation throughput. For our high quality entropy byte generator, our tests have established that the selection of bits grouped by multiple of two bits provides sufficient entropy measured in bits per byte. The table below summarizes the entropy results for some selections of bits grouped by multiple of two bits captured by the ADC: selection of the two least significant bits captured by the ADC, of the four least significant bits captured by the ADC, of the six least significant bits captured by the ADC and of the eight least significant bits captured by the ADC.

| Number of selected bits | Estimated entropy (bits per byte) |
|---|---|
| 2 | 4.098176 |
| 4 | 6.839224 |
| 6 | 7.967865 to 7.990775 |
| 8 | 7.851363 |

It may have been expected that the entropy would increase as the number of selected least significant bits decreases because the bit fluctuations increases for the least significant bits. Surprisingly, the highest entropy was measured for the selection of the six least significant bits captured by the ADC (and the discarding of the four most significant bits captured by the ADC).

Depending on the number of least significant bits, which are selected during each ADC sampling cycle, the processing unit performs different types of concatenation to generate a bytes flow. For example, in the case of a selection of the six least significant bits captured by the ADC, the sample values obtained from the noise source are combined into bit strings of 24 bits. These 24-bits samples are obtained by performing four consecutive reading operations of the six least significant bits of the ADC register. Thus, four consecutive reading operations result into an output of three bytes. For this particular selection rule, the entropy statistical tests are performed on datasets of 1.000.000 samples of 24 bits generated by the entropy source, i.e. on datasets of 3 Mbytes.

Based on the entropy tests performed for the different selection rules, the selection of the six least significant bits is the preferred rule, although selecting eight bits (i.e., a byte) for each ADC sampling cycle does not require any concatenation of several ADC sampling cycles in order to obtain a complete byte and would provide a higher bytes generation throughput. Because the highest entropy is deemed essential in the case of the mailing systems application, the selection of the six least significant bits is a preferred rule compared to the selection of a full byte, even though this rule does not provide the highest bytes generation throughput.

A remarkable aspect of the disclosed random byte generator is that it provides a high quality entropy without resorting to any conditioning stage. Typically, random byte generators need to include some conditioning stage to achieve a high quality entropy, and various adjustments and optimization of components and parameters must be performed on the random byte generator, for example the adjustment of the output amplitude of noise signal. These conditioning stages must be included in the random byte generator when the adjustments and optimization of components and parameters take place. In the case of the random byte generator, the selection of the six least significant bits is not based on any conditioning stage, which is not necessary for the invention, as well as it is not based on any adjustment of the output amplitude of noise signal provided as an entry for the ADC.

It must be noted that the preferred embodiment provides a high quality entropy source—measured entropy estimations between 7.967865 and 7.990775 bits per byte—for a cost as low as a few Euros. The measured entropy of this innovative entropy source is particularly high as typical entropy values for low cost entropy sources are comprised between 3 and 5 bits per byte, and given the fact that the maximum entropy value is eight bits per byte.

As illustrated on FIG. 3, the health test component 10 is an integral part of the entropy source, and ensures that the noise source and the entropy source as a whole continue to operate as expected. The health tests can be separated into three categories: start-up tests—performed on all components, continuous tests—performed mostly on the noise source, and on-demand tests—i.e. tests that are more thorough and time-consuming than the continuous tests. The PSD performs the following start-up and continuous health tests:

Repetition Count Test: the six least significant bits, resulting from the truncation of the ten bits captured by the ADC, are continuously monitored. In case the same six bits are captured consecutively six times, the PSD generates a fail error.

Adaptive Proportion test: in case the same six bits are captured nine times by the ADC within a window of 64 consecutive capture cycles, the PSD generates a fail error.

In order to ensure the high quality entropy of the random byte generator, it is preferable to block its operation until it operates correctly again. For the random byte generator, the processing unit is programmed so that, whenever a health test fail error is generated, the PSD enters in an error state (faulted state) and deletes the master key, which is required to access all critical security parameters and data. Such an irreversible operation is called "zeroization". In case of zeroization, the PSD does not operate any longer: it must be replaced by a new PSD, and the zeroized PSD is destroyed.

While the preferred embodiment has been described in more details for a ten bits ADC with the preferred rule of selecting the six least significant bits digitized by the ADC, it is to be understood that the invention is not limited to the usage of an ADC and of this specific selection rule, but on the contrary, is intended to cover various types of digitizers and any selection rules for selecting bits captured by the digitizer.

The invention claimed is:

1. A random byte generator comprising:
a noise source configured to generate a noise signal, said noise source which comprises no more than three discrete transistors, a first one of the discrete transistors having a collector which is not connected and an emitter-base PN junction that creates the noise signal for said noise source;
a digitizer possessing a voltage input range and a resolution of no less than two bits and configured to digitize the noise signal from said noise source; and
a processor configured to apply pre-defined rules for selecting bits captured by said digitizer and to generate random bit strings by combining said selected bits.

2. A random byte generator according to claim 1 wherein said noise source amplifies said noise signal to provide a peak-to-peak random voltage amplitude matching said voltage input range of said digitizer.

3. A random byte generator according to claim 2 wherein said noise source includes a final stage centering the continuous component of said peak-to-peak random voltage amplitude in the middle of said digitizer voltage input range.

4. A random byte generator according to claim 1 wherein said pre-defined rules include rules of selecting the least significant bits digitized by said digitizer and of excluding at least the most significant bit digitized by said digitizer.

5. A random byte generator according to claim 4 wherein said digitizer has a ten bits resolution and said pre-defined rules consist in selecting the six least significant bits digitized by said digitizer.

6. A random byte generator according to claim 1 wherein said processor is configured to perform said combining said selected bits by concatenating into bytes the bits selected by said processor.

7. A random byte generator according to claim 1 wherein said discrete transistors are of the type 2N3904.

8. A random byte generator according to claim 1 wherein said noise source comprises at a respective output thereof a low pass filter to comply with electromagnetic compatibility regulations.

9. A method for generating random byte including:
generating a noise signal with a noise source, said noise source which comprises no more than three discrete transistors, a first one of the discrete transistors having a collector which is not connected and an emitter-base PN junction that creates the noise signal for said noise source;
digitizing the noise signal from said noise source with a digitizer possessing a voltage input range and a resolution of no less than two bits;
applying in a processor pre-defined rules for selecting bits captured by said digitizer; and
combining in said processor said selected bits for generating random bit strings.

10. A method according to claim 9 further including:
amplifying said noise signal to provide a peak-to-peak random voltage amplitude matching said voltage input range of said digitizer; and
centering the continuous component of said peak-to-peak random voltage amplitude in the middle of said digitizer voltage input range.

11. A method according to claim 10 wherein said digitizer has a ten bits resolution and said pre-defined rules consist in selecting the six least significant bits digitized by said digitizer.

12. A method according to claim 9 wherein said pre-defined rules consist in selecting the least significant bits digitized by said digitizer and excluding at least the most significant bit digitized by said digitizer.

13. A method according to claim 9 wherein said combining said selected bits comprises concatenating into bytes the bits selected by said processor.

14. A method according to claim 9 wherein the processor is part of a postal security device.

15. A method according to claim 14 wherein whenever a health test fail error is generated by the random byte generator, the postal security device deletes a master key, which is required to access all critical security parameters and data.

* * * * *